(12) United States Patent
Kim et al.

(10) Patent No.: US 9,245,733 B2
(45) Date of Patent: Jan. 26, 2016

(54) MICROWAVE PLASMA DISCHARGE LIGHTING SYSTEM WITH ADJUSTABLE COLOR TEMPERATURE

(71) Applicant: LG Electronics Inc., Seoul (KR)

(72) Inventors: Donghun Kim, Seoul (KR); Hyunjung Kim, Seoul (KR); Junsung Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 14/335,690

(22) Filed: Jul. 18, 2014

(65) Prior Publication Data

US 2015/0214023 A1 Jul. 30, 2015

(30) Foreign Application Priority Data

Jan. 27, 2014 (KR) .................. 10-2014-0009485

(51) Int. Cl.
*H01J 65/04* (2006.01)
*H01J 61/52* (2006.01)
*H05B 41/28* (2006.01)

(52) U.S. Cl.
CPC .............. *H01J 65/044* (2013.01); *H01J 61/523* (2013.01); *H05B 41/2806* (2013.01)

(58) Field of Classification Search
CPC .............................. H01J 65/044; H01J 65/048
USPC ........................................................ 315/248
See application file for complete search history.

(56) References Cited

U.S. PATENT DOCUMENTS

| | | | |
|---|---|---|---|
| 4,954,756 A | 9/1990 | Wood et al. | |
| 4,954,759 A | 9/1990 | Fey | |
| 4,978,891 A | 12/1990 | Ury | |
| 5,404,076 A | 4/1995 | Dolan et al. | |
| 6,476,557 B1* | 11/2002 | Leng et al. | ............. 313/637 |
| 6,946,795 B2 | 9/2005 | Jeon et al. | |
| 2002/0030453 A1* | 3/2002 | Kirkpatrick et al. | .......... 315/248 |
| 2002/0101191 A1 | 8/2002 | Dolan et al. | |
| 2006/0055300 A1 | 3/2006 | Janos et al. | |
| 2014/0132153 A1* | 5/2014 | Kim et al. | .............. 315/39 |
| 2015/0155155 A1* | 6/2015 | Kim et al. | ............. H01J 65/044 |
| 2015/0214022 A1* | 7/2015 | Kim et al. | ............. H01J 65/044 |

FOREIGN PATENT DOCUMENTS

WO   WO 93/21655 A1   10/1993

* cited by examiner

*Primary Examiner* — Dylan White
(74) *Attorney, Agent, or Firm* — Birch, Stewart, Kolasch & Birch, LLP

(57) ABSTRACT

A plasma lighting system includes a magnetron configured to generate microwaves, and a bulb filled with a main dose and an additive dose. The main dose and the additive dose generate light under the influence of microwaves and have maximum intensities of respective intrinsic wavelengths at different wavelengths. A motor is configured to rotate the bulb. A controller is connected to the motor. The controller adjusts the Revolutions Per Minute (RPM) of the bulb to thereby adjust a color temperature of light emitted from the bulb.

17 Claims, 4 Drawing Sheets

MICROWAVE PLASMA DISCHARGE LIGHTING SYSTEM WITH ADJUSTABLE COLOR TEMPERATURE

This application claims the benefit of Korean Patent Application No. 10-2014-0009485, filed on Jan. 27, 2014, which is hereby incorporated by reference as if fully set forth herein.

BACKGROUND OF THE INVENTION

1. Field of the Invention

The present invention relates to a plasma lighting system, and more particularly, to a plasma lighting system which may adjust a Correlated Color Temperature (CCT) of light.

2. Discussion of the Related Art

In general, a lighting system using microwaves (several hundred MHz to several GHz) is designed to generate visible light by applying microwaves to an electrodeless plasma bulb.

The microwave lighting system is an electrodeless discharge lamp in which a quartz bulb having no electrode is filled with inert gas. The microwave lighting system is configured to emit a continuous spectrum in a visible light range via high voltage electrical discharge using sulfur. The microwave lighting system is also referred to as a plasma lighting system.

Meanwhile, the plasma lighting system has no change in Correlated Color Temperature (CCT) in a thermally stabilized state thereof. That is, a color temperature of light from the plasma lighting system is determined only based on the quantity and kind of dose filling a bulb. In addition, when a change in color temperature is required, replacement of the entire bulb is necessary.

SUMMARY OF THE INVENTION

Accordingly, the present invention is directed to a plasma lighting system that substantially obviates one or more problems due to limitations and disadvantages of the related art.

One object of the present invention is to provide a plasma lighting system which may change a Correlated Color Temperature (CCT) of light.

Another object of the present invention is to provide a plasma lighting system which may adjust a CCT of light during operation.

Another object of the present invention is to provide a plasma lighting system which may increase or reduce the intensity of light at a specific wavelength.

A further object of the present invention is to provide a plasma lighting system which may achieve a luminous flux of a given level or more, may maintain a desired luminous efficacy, and may change a CCT of light.

To achieve these objects and other advantages and in accordance with the purpose of the invention, as embodied and broadly described herein, a plasma lighting system includes a magnetron configured to generate microwaves, a bulb filled with a main dose and an additive dose, wherein the main dose and the additive dose generate light under the influence of microwaves and have the maximum intensities of respective intrinsic wavelengths at different wavelengths, a motor configured to rotate the bulb, and a controller connected to the motor, wherein the controller adjusts Revolutions Per Minute (RPM) of the bulb.

Here, the boiling point of the main dose differs from the boiling point of the additive dose.

The boiling point of the additive dose may be higher than the boiling point of the main dose.

The controller may adjust a color temperature of light emitted from the bulb by changing the RPM of the bulb.

In accordance with another aspect of the present invention, a plasma lighting system includes a magnetron configured to generate microwaves, a bulb filled with a main dose, a first additive dose, and a second additive dose, wherein the main dose, the first additive dose, and the second additive dose generate light under the influence of microwaves. The main dose has a maximum intensity of an intrinsic wavelength at a first wavelength, the first additive dose has a maximum intensity of an intrinsic wavelength at a second wavelength lower than the first wavelength, and the second additive dose has a maximum intensity of an intrinsic wavelength at a third wavelength higher than the first wavelength. A motor is configured to rotate the bulb, and a controller is connected to the motor, wherein the controller adjusts Revolutions Per Minute (RPM) of the bulb.

Here, the main dose and the first and second additive doses have different boiling points.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Hereinafter, a plasma lighting system according to one embodiment of the present invention will be described in detail with reference to the accompanying drawings. The accompanying drawings show an exemplary configuration of the present invention and are merely provided to describe the present invention in detail, and the scope of the present invention is not limited by the accompanying drawings and the detailed description thereof.

Figure 1:
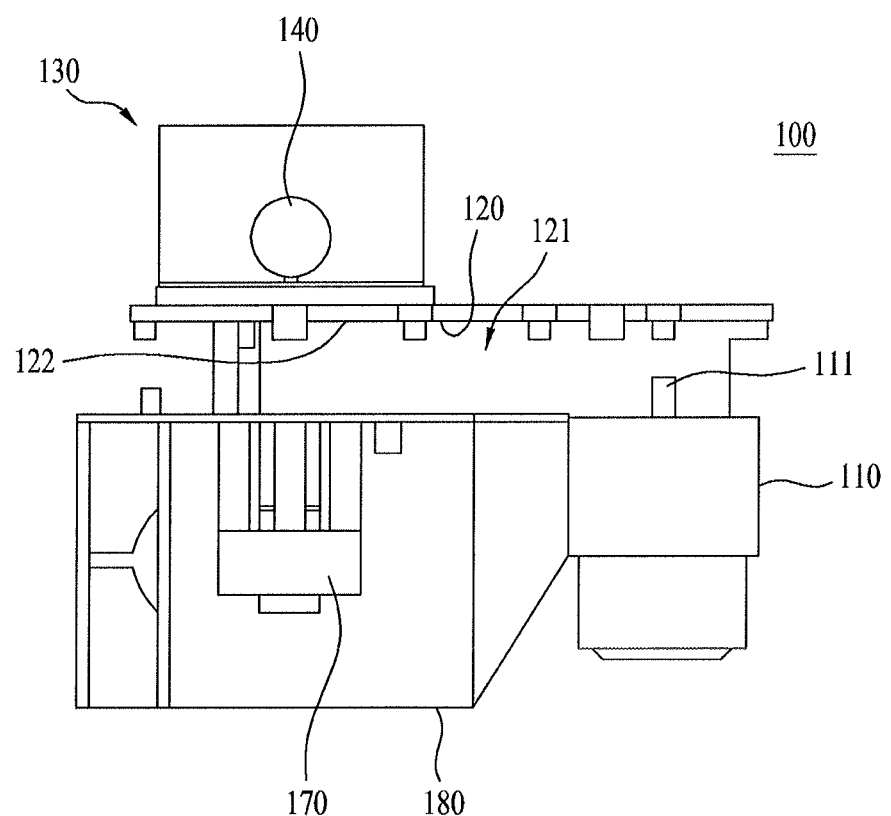
FIG. 1 is a conceptual view showing a plasma lighting system according to one embodiment of the present invention.
Figure 2:
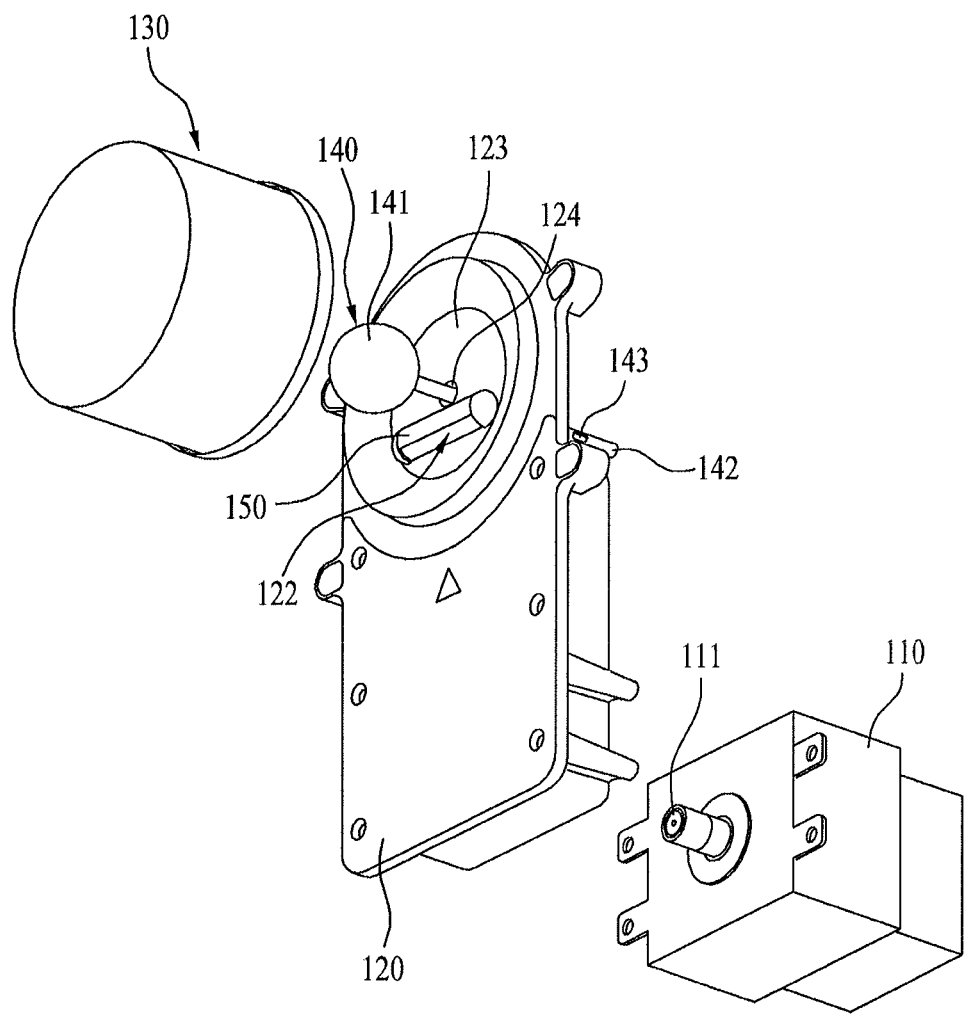
FIG. 2 is an exploded perspective view showing the plasma lighting system according to the embodiment of the present invention.

FIG. 1 is a conceptual view showing a plasma lighting system according to one embodiment of the present invention, and FIG. 2 is an exploded perspective view showing the plasma lighting system according to the embodiment of the present invention.

Referring to FIGS. 1 and 2, the plasma lighting system, designated by reference numeral 100, includes a magnetron 110, a waveguide 120, and a bulb 140. In addition, the plasma lighting system 100 may include a resonator 130 surrounding the bulb 140, and a drive unit 170 (e.g., a motor) to rotate the bulb 140.

In addition, the plasma lighting system 100 may include a housing 180 defining an external appearance of the plasma lighting system 100. The drive unit 170 and/or the magnetron 110 may be received in the housing 180. In addition, at least a portion of the waveguide 120 may be received in the housing 180.

Hereinafter, the respective constituent elements of the plasma lighting system 100 will be described in detail.

The magnetron 110 serves to generate microwaves having a predetermined frequency. In addition, a high voltage generator may be formed integrally with or separately from the magnetron 110. The high voltage generator generates a high voltage. As the high voltage generated by the high voltage generator is applied to the magnetron 110, the magnetron 110 generates microwaves having a radio frequency.

The waveguide 120 may include a waveguide space 121 for guidance of the microwaves generated by the magnetron 110, and an opening 122 for transmission of the microwaves to the resonator 130. An antenna unit 111 of the magnetron 110 may be inserted into the waveguide space 121. The microwaves are guided through the waveguide space 121, and thereafter transmitted to the interior of the resonator 130 through the opening 122. In addition, a portion of the waveguide 120 may define an external appearance of the plasma lighting system 100.

The resonator 130 creates a resonance mode by preventing outward discharge of the introduced microwaves. The resonator 130 may function to generate a strong electric field by exciting the microwaves. In one embodiment, the resonator 130 may have a mesh form.

In addition, to allow the microwaves to be introduced into the resonator 130 only through the opening 122, the resonator 130 may be mounted to surround the opening 122 of the waveguide 120 and the bulb 140.

A reflective member 150 may be mounted at the opening 122 of the waveguide 120 to surround a portion of the opening 122. More specifically, the reflective member 150 may be mounted at a predetermined region 123 of the waveguide 120 having the opening 122. The bulb 140 may penetrate the predetermined region 123 to thereby be connected to the motor 170. The predetermined region 123 may be surrounded by the resonator 130.

The reflective member 150 functions to guide the microwaves to be introduced into the resonator 130 through the opening 122.

In addition, the reflective member 150 may function to reflect the microwaves introduced into the resonator 130 toward the bulb 140, in order to concentrate an electric field on the bulb 140.

The bulb 140, in which a light emitting material is received, may be placed within the resonator 130, and a rotating shaft 142 of the bulb 140 may be coupled to the motor 170 as described above. Rotating the bulb 140 via the motor 170 may prevent generation of a hot spot or concentration of an electric field on a specific region of the bulb 140.

The bulb 140 may include a spherical casing 141 in which a light emitting material is received, and the rotating shaft 142 extending from the casing 141.

In addition, a photo sensor 143 may be mounted to the rotating shaft 142. The photo sensor 143 functions to sense optical properties of light emitted from the bulb 140. In addition, the photo sensor 143 measures the intensity of light having a specific wavelength. A detailed description thereof will follow.

The light emission principle of the plasma lighting system 100 having the above-described configuration will be described below.

Microwaves generated in the magnetron 110 are transmitted to the resonator 130 through the waveguide 120. Then, as the microwaves introduced into the resonator 130 are resonated in the resonator 130, the light emitting material in the bulb 140 is excited. In this case, the light emitting material received in the bulb 140 generates light via conversion thereof into plasma, and the light is emitted outward of the resonator 130.

The plasma lighting system 100 may further include a reflective member (not shown) to adjust the direction of light emitted from the bulb 140 and to guide the light outward of the resonator 130. The reflective member may be a semi-spherical shade.

In this specification, the term "dose" represents a light emitting material that emits light by being excited by microwaves. The bulb 140 is filled with the dose. Specifically, the dose consists of a main dose including sulfur, and an additive dose to raise or lower a color temperature of light emitted from the plasma lighting system 100.

Figure 3:
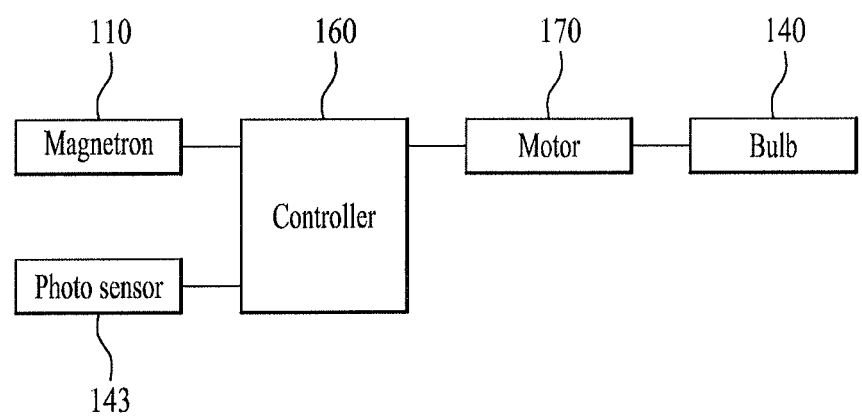
FIG. 3 is a view showing a configuration of the plasma lighting system according to the embodiment of the present invention.

FIG. 3 is a view showing a configuration of the plasma lighting system according to the embodiment of the present invention.

The plasma lighting system 100 includes a controller 160 connected to the motor 170 and functions to adjust Revolutions Per Minute (RPM) of the bulb 140. The controller 160 may adjust the RPM of the motor 170, thereby adjusting the RPM of the bulb 140 connected to the motor 170. The controller 160 is electrically connected to the photosensor 143 so as to receive information of optical properties from the photo sensor 143.

The bulb 140 radiates heat outward via rotation thereof. Accordingly, the RPM of the bulb 140 is associated with the temperature of the bulb 140.

More specifically, when the RPM of the bulb 140 (or the RPM of the motor 170) is increased, the temperature of the bulb 140 is lowered. In addition, when the RPM of the bulb 140 (or the RPM of the motor 170) is reduced, the temperature of the bulb 140 is raised.

In addition, the temperature of the bulb 140 is associated with the boiling point of the dose. As described above, the dose within the bulb 140 generates light by being converted into plasma. More specifically, as the temperature of the bulb 140 is raised to the boiling point of the dose or more, the dose generates light.

Figure 4:
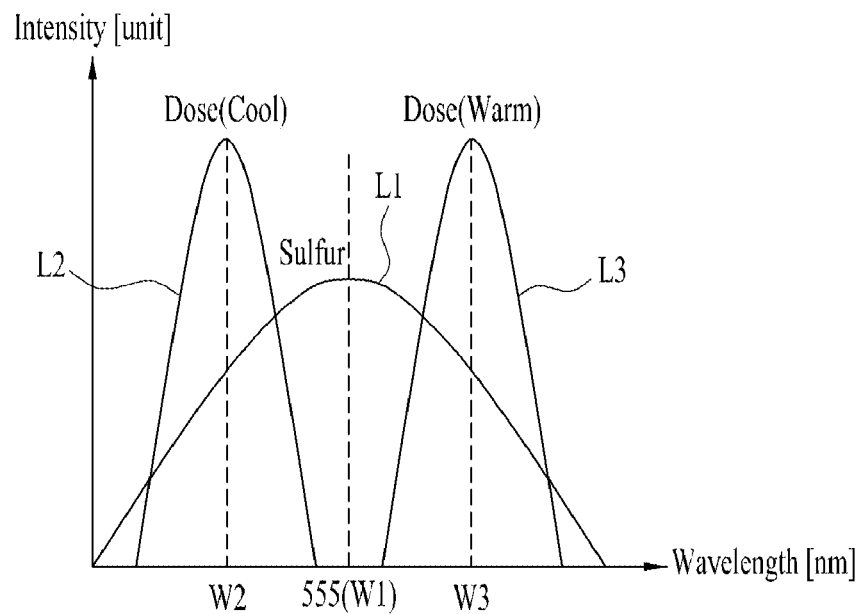
FIGS. 4 to 6 are graphs showing an operational state of the plasma lighting system according to the present invention.

FIG. 4 is a graph showing an operational state of the plasma lighting system according to the present invention. In FIG. 4, radiation waveforms of respective doses are shown.

The bulb 140 is filled with a main dose and an additive dose having the maximum intensities of respectively intrinsic wavelengths at different wavelengths. The main dose and the additive dose respectively generate light under the influence of microwaves.

Here, the boiling point of the main dose differs from the boiling point of the additive dose. More specifically, a temperature of the bulb 140 at which the main dose is evaporated to generate light differs from a temperature of the bulb 140 at which the additive dose is evaporated to generate light.

Through adjustment of the temperature of the bulb 140, only the main dose may undergo plasma evaporation to generate light, or both the main dose and the additive dose may undergo plasma evaporation to generate light.

As described above, the main dose and the additive dose have maximum intensities of respective intrinsic wavelengths at different wavelengths. Accordingly, a first case in which light is generated as only the main dose is converted into plasma and a second case in which light is generated as both the main dose and the additive dose are converted into plasma result in different optical properties (for example, color temperature).

Here, the boiling point of the additive dose is higher than the boiling point of the main dose. In addition, the additive dose may have a higher melting point and a higher boiling point than those of the main dose. In this case, when microwaves are applied, the main dose may first be converted into plasma, thus generating light. Thereafter, when the temperature of the bulb 140 is raised, the additive dose may be converted into plasma, thus generating light.

As described above, the temperature of the bulb 140 may be adjusted by controlling the RPM of the bulb 140. More specifically, to evaporate the additive dose, it is necessary to raise the temperature of the bulb 140. To this end, it is necessary to reduce the RPM of the bulb 140.

Accordingly, the controller 160 may adjust a color temperature of light emitted from the bulb 140 by changing the RPM of the bulb 140.

In one embodiment, the main dose may include sulfur, which has a maximum intensity of an intrinsic wavelength at a first wavelength W1 (for example, 555 nm). In addition, the additive dose may have a maximum intensity of an intrinsic wavelength at a second wavelength W2 that is lower than the first wavelength W1.

The additive dose serves to raise a color temperature of light. For convenience of description, the additive dose may be referred to as a first additive dose or a cool dose. Reference numeral L1 designates a radiation waveform of sulfur, and reference numeral L2 designates a radiation waveform of the first additive dose.

In this case, the first additive dose may include at least one metal halide.

More specifically, the first additive dose may include a compound of a metal and a halogen.

The metal may be one selected from the group consisting of potassium (K), copper (Cu), barium (Ba), and cesium (Cs). In addition, the halogen may be one selected from the group consisting of chlorine (Cl), bromine (Br), iodine (I), and astatine (At).

More specifically, the first additive dose may be at least one of compounds of a metal including K, Cu, Ba, or Cs and a halogen including Cl, Br, I, or At.

Here, the boiling point of the first additive dose is higher than the boiling point of the main dose. In addition, the first additive dose may have a higher melting point and a higher boiling point than those of the main dose.

For convenience of description, the RPM of the bulb 140 that causes evaporation of the main dose, i.e. sulfur, is defined as a first RPM, and the RPM of the bulb 140 that causes evaporation of the first additive dose is defined as a second RPM.

In this case, the first RPM is greater than the second RPM. That is, when the RPM of the bulb 140 is changed from the first RPM to the second RPM (speed reduction), evaporation of the first additive dose may occur.

The controller 160 may raise a color temperature of light by reducing the RPM of the bulb 140 to cause evaporation of the additive dose (i.e. the first additive dose).

That is, light generated by the first additive dose increases the intensity of light having a specific wavelength emitted from the bulb 140. Consequently, a color temperature of light generated from the plasma lighting system 100 is raised.

Meanwhile, the aforementioned photo sensor 143 may sense light having a specific wavelength band. In one embodiment, the photo sensor 143 may be configured to sense a peak wavelength band of the first additive dose.

In addition, the photo sensor 143 may be installed to the rotating shaft 142 of the bulb 140. As described above, the bulb 140 may penetrate the predetermined region 123 of the waveguide 120 to thereby be connected to the motor 170.

In this case, the photo sensor 143 may sense optical properties of light having passed through an insertion hole 124 for insertion of the rotating shaft 142 of the bulb 140. More specifically, the photo sensor 143 may sense optical properties of light having passed through a clearance between the rotating shaft 142 of the bulb 140 and the insertion hole 124.

In another embodiment, the main dose may include sulfur, which has a maximum intensity of an intrinsic wavelength at the first wavelength W1 (for example, 555 nm). In addition, the additive dose may have the maximum intensity of an intrinsic wavelength at a third wavelength W3 that is higher than the first wavelength W1. Reference numeral L3 designates a radiation waveform of a second additive dose.

In the present embodiment, the additive dose serves to lower a color temperature of light. For convenience of description, the additive dose may be referred to as a second additive dose or a warm dose. In this case, the second additive dose may include at least one metal halide.

More specifically, the second additive dose may include a compound of a metal and a halogen.

The metal may be one selected from the group consisting of lithium (Li), sodium (Na), calcium (Ca), strontium (Sr), and rubidium (Rb). In addition, the halogen may be one selected from the group consisting of chlorine (Cl), bromine (Br), iodine (I), and astatine (At).

More specifically, the second additive dose may be at least one of compounds of a metal including Li, Na, Ca, Sr, or Rb and a halogen including Cl, Br, I, or At.

Here, the boiling point of the second additive dose is higher than the boiling point of the main dose. In addition, the second additive dose may have a higher melting point and higher boiling point than those of the main dose.

For convenience of description, the RPM of the bulb 140 that causes evaporation of the main dose, i.e. sulfur is defined as a first RPM, and the RPM of the bulb 140 that causes evaporation of the second additive dose is defined as a third RPM. In this case, the first RPM is greater than the third RPM. That is, when the RPM of the bulb 140 is changed from the first RPM to the third RPM (speed reduction), evaporation of the second additive dose may occur.

The controller 160 may lower a color temperature of light by reducing the RPM of the bulb 140 to cause evaporation of the additive dose (i.e. the second additive dose).

That is, light generated by the second additive dose increases the intensity of light having a specific wavelength emitted from the bulb 140. Consequently, a color temperature of light generated from the plasma lighting system 100 is lowered.

Meanwhile, the aforementioned photo sensor 143 may sense light having a specific wavelength band. In one embodiment, the photo sensor 143 may be configured to sense a peak wavelength band of the second additive dose.

Referring to FIG. 4, the bulb 140 is filled with the main dose, the first additive dose, and the second additive dose. The main dose may include sulfur having a maximum intensity of an intrinsic wavelength at the first wavelength W1.

In addition, the first additive dose has a maximum intensity of an intrinsic wavelength at the second wavelength W2 that is lower than the first wavelength W1. In addition, the second additive dose has a maximum intensity of an intrinsic wavelength at the third wavelength W3 that is higher than the first wavelength W1

More specifically, the bulb 140 may be filled with the cool dose and the warm dose as mentioned above. That is, as the cool dose or the warm dose is selectively evaporated, a color temperature of light may be raised or lowered.

Here, the main dose and the first and second additive doses have different boiling points.

The respective boiling points of the first and second additive doses are higher than the boiling point of the main dose. This serves to allow the main dose to be firstly converted into plasma when microwaves are applied thereto.

As described above, the controller 160 may adjust a color temperature of light emitted from the bulb 140 by changing the RPM of the bulb 140. That is, the controller 160 may adjust the RPM of the bulb 140 to selectively evaporate the first additive dose (cool dose) or the second additive dose (warm dose), according to the embodiments described hereinbelow.

Figure 5:
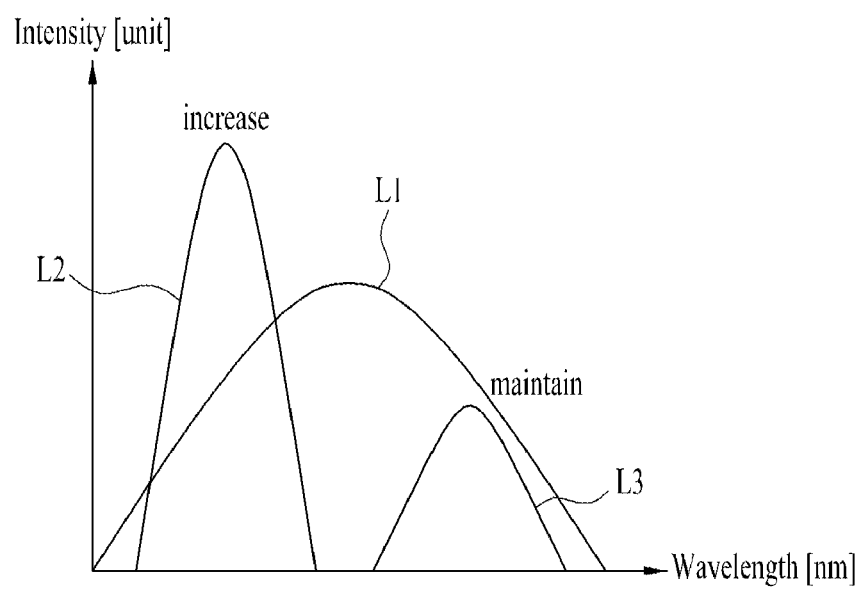
Figure 6:
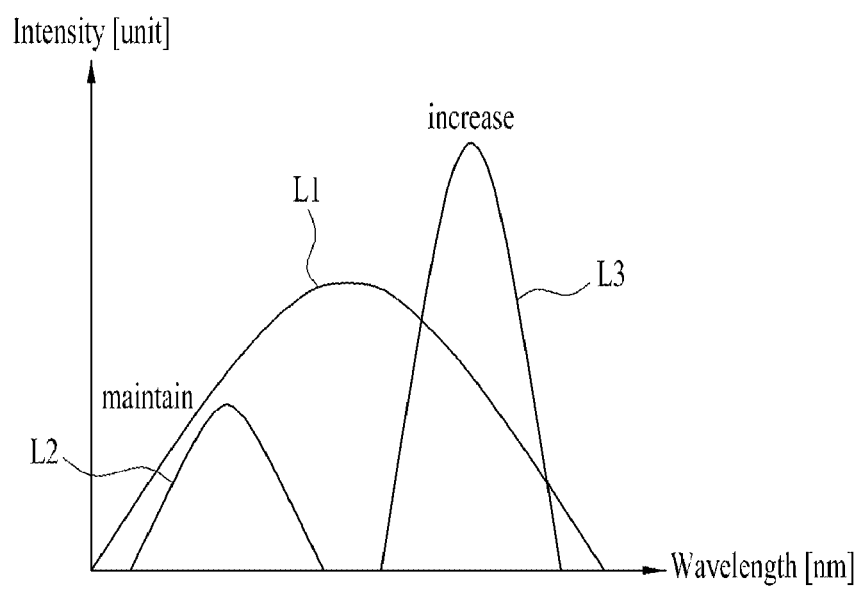

FIGS. 5 and 6 are graphs showing an operational state of the plasma lighting system according to the present invention.

In one embodiment, the boiling point of the second additive dose (warm dose) may be higher than the boiling point of the main dose. In addition, the boiling point of the first additive dose (cool dose) may be higher than the boiling point of the second additive dose. In this case, when microwaves are applied, the main dose is first evaporated. In addition, when the temperature of the bulb 140 is gradually raised, the second additive dose is evaporated. Then, when the temperature of the bulb 140 is further raised, the first additive dose is evaporated.

Meanwhile, in a case in which the second additive dose is evaporated and the first additive dose is not evaporated in a specific temperature range of the bulb 140, the controller 160 may lower a color temperature of light.

Referring to FIG. 5, when the temperature of the bulb 140 is further raised after evaporation of the second additive dose, evaporation of the first additive dose occurs. Thereby, the intrinsic wavelength intensity of the second additive dose is maintained and the intrinsic wavelength intensity of the first additive dose is increased. In this way, a color temperature of light emitted from the plasma lighting system 100 may be adjusted.

In another embodiment, the boiling point of the second additive dose (warm dose) may be higher than the boiling point of the first additive dose (cool dose). In addition, the boiling point of the first additive dose (cool dose) may be higher than the boiling point of the main dose.

In this case, when microwaves are applied, the main dose is first evaporated. In addition, when the temperature of the bulb 140 is gradually raised, the first additive dose is evaporated. Then, when the temperature of the bulb 140 is further raised, the second additive dose is evaporated.

Meanwhile, in a case in which the first additive dose is evaporated and the second additive dose is not evaporated in a specific temperature range of the bulb 140, the controller 160 may raise a color temperature of light.

Referring to FIG. 6, when the temperature of the bulb 140 is further raised after evaporation of the first additive dose, evaporation of the second additive dose occurs. Thereby, the intrinsic wavelength intensity of the first additive dose is maintained and the intrinsic wavelength intensity of the second additive dose is increased. In this way, a color temperature of light emitted from the plasma lighting system 100 may be adjusted.

As is apparent from the above description, a plasma lighting system according to one embodiment of the present invention has the following effects.

Through use of an additive dose such as a metal halide, a Correlated Color Temperature (CCT) of light emitted from the plasma lighting system may be changed. In particular, a change in CCT may be implemented during operation of the plasma lighting system.

In addition, the additive dose may include at least one of a cool dose and a warm dose.

In addition, as the temperature of a bulb is adjusted to selectively evaporate the additive dose, the intensity of light having a specific wavelength may be increased or reduced. In this case, the temperature of the bulb may be adjusted by controlling revolutions per minute of the bulb.

In addition, the boiling point of the additive dose is higher than the boiling point of a main dose. Thus, the main dose, such as sulfur, may first be evaporated, and then the additive dose may be selectively evaporated. In this way, the plasma lighting system may achieve a luminous flux of a given level or more, may maintain a desired luminous efficacy, and may change a CCT of light.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents.

What is claimed is:

1. A plasma lighting system comprising:
    a magnetron configured to generate microwaves;
    a bulb filled with a main dose and an additive dose, wherein the main dose and the additive dose generate light under the influence of microwaves and have maximum intensities of respective intrinsic wavelengths at different wavelengths;
    a motor configured to rotate the bulb; and
    a controller connected to the motor, the controller being configured to adjust Revolutions Per Minute (RPM) of the bulb,
    wherein the boiling point of the main dose differs from the boiling point of the additive dose, and
    wherein the controller is configured to change the RPM of the bulb to thereby adjust a color temperature of light emitted from the bulb.

2. The system according to claim 1, wherein the boiling point of the additive dose is higher than the boiling point of the main dose.

3. The system according to claim 1, wherein the main dose includes sulfur having a maximum intensity of an intrinsic wavelength at a first wavelength,
    wherein the additive dose has a maximum intensity of an intrinsic wavelength at a second wavelength, the second wavelength being lower than the first wavelength, and
    wherein the controller is configured to raise a color temperature of light by reducing the RPM of the bulb to cause evaporation of the additive dose.

4. The system according to claim 3, wherein the additive dose includes at least one of compounds of a metal including potassium (K), copper (Cu), barium (Ba), or cesium (Cs) and a halogen including chlorine (Cl), bromine (Br), iodine (I), or astatine (At).

5. The system according to claim 1, wherein the main dose includes sulfur having a maximum intensity of an intrinsic wavelength at a first wavelength,
    wherein the additive dose has a maximum intensity of an intrinsic wavelength at a third wavelength, the third wavelength being higher than the first wavelength, and wherein the controller is configured to lower a color temperature of light by reducing the RPM of the bulb to cause evaporation of the additive dose.

6. The system according to claim 5, wherein the additive dose includes at least one of compounds of a metal including lithium (Li), sodium (Na), calcium (Ca), strontium (Sr), or rubidium (Rb) and a halogen including chlorine (Cl), bromine (Br), iodine (I), or astatine (At).

7. A plasma lighting system comprising:
a magnetron configured to generate microwaves;
a bulb filled with a main dose, a first additive dose and a second additive dose, wherein the main dose, the first additive dose and the second additive dose generate light under the influence of microwaves, the main dose having a maximum intensity of an intrinsic wavelength at a first wavelength, the first additive dose having a maximum intensity of an intrinsic wavelength at a second wavelength lower than the first wavelength, and the second additive dose having a maximum intensity of an intrinsic wavelength at a third wavelength higher than the first wavelength;
a motor configured to rotate the bulb; and
a controller connected to the motor, the controller being configured to adjust Revolutions Per Minute (RPM) of the bulb,
wherein the main dose, the first additive dose and the second additive dose have different boiling points.

8. The system according to claim 7, wherein the controller is configured to change the RPM of the bulb to thereby adjust a color temperature of light emitted from the bulb.

9. The system according to claim 7, wherein the respective boiling points of the first and second additive doses are respectively higher than the boiling point of the main dose.

10. The system according to claim 7, wherein the controller adjusts the RPM of the bulb to selectively evaporate the first additive dose.

11. The system according to claim 7, wherein the controller adjusts the RPM of the bulb to selectively evaporate the second additive dose.

12. The system according to claim 7, wherein the main dose includes sulfur having a maximum intensity of an intrinsic wavelength at the first wavelength,
wherein the first additive dose includes at least one of compounds of a metal including potassium (K), copper (Cu), barium (Ba) or cesium (Cs) and a halogen including chlorine (Cl), bromine (Br), iodine (I) or astatine (At), and
wherein the controller is configured to raise a color temperature of light by reducing the RPM of the bulb to cause evaporation of the first additive dose.

13. The system according to claim 7, wherein the main dose includes sulfur having a maximum intensity of an intrinsic wavelength at the first wavelength,
wherein the second additive dose includes at least one of compounds of a metal including lithium (Li), sodium (Na), calcium (Ca), strontium (Sr) or rubidium (Rb) and a halogen including chlorine (Cl), bromine (Br), iodine (I) or astatine (At), and
wherein the controller is configured to lower a color temperature of light by reducing the RPM of the bulb to cause evaporation of the second additive dose.

14. The system according to claim 7, wherein the boiling point of the first additive dose is higher than the boiling point of the second additive dose, and
wherein the controller lowers a color temperature of light by evaporating the second additive dose, and adjusts the color temperature by additionally evaporating the first additive dose.

15. The system according to claim 7, wherein the boiling point of the second additive dose is higher than the boiling point of the first additive dose, and
wherein the controller raises a color temperature of light by evaporating the first additive dose, and adjusts the color temperature by additionally evaporating the second additive dose.

16. A plasma lighting system comprising:
a magnetron configured to generate microwaves;
a bulb filled with a main dose and one or more additive doses, wherein the main dose and the additive doses generate light under the influence of microwaves and have maximum intensities of respective intrinsic wavelengths at different wavelengths;
a motor configured to rotate the bulb; and
a controller connected to the motor, the controller being configured to adjust a color temperature of light emitted from the bulb by adjusting Revolutions Per Minute (RPM) of the bulb,
wherein the boiling points of the additive doses are higher than the boiling point of the main dose, and
wherein the controller additionally evaporates the additive doses by reducing the RPM of the bulb in a state in which the main dose is evaporated.

17. The system according to claim 16, wherein the one or more additive doses comprise a first additive dose having a maximum intensity of an intrinsic wavelength at a lower wavelength than that of the main dose, and a second additive dose having a maximum intensity of an intrinsic wavelength at a higher wavelength than that of the main dose.

* * * * *